Sept. 20, 1971          W. J. RIFFE          3,606,452
VEHICLE SEAT
Filed Feb. 2, 1970          3 Sheets-Sheet 1
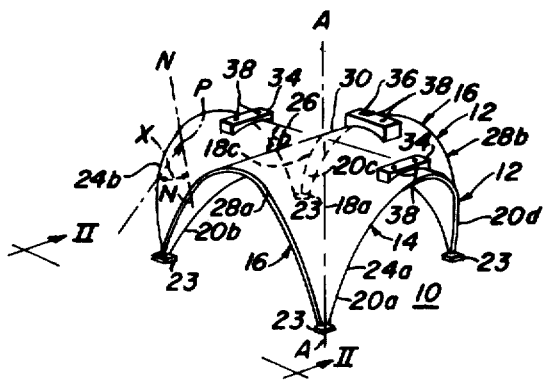
FIG. 1
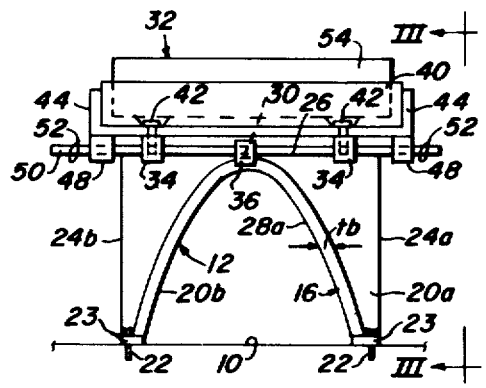
FIG. 2
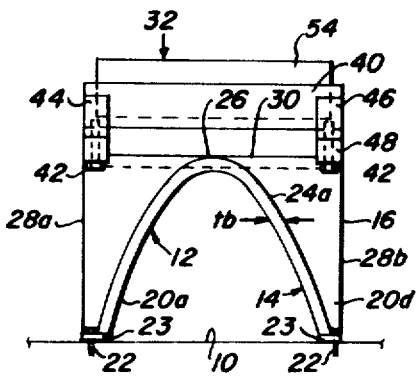
FIG. 3
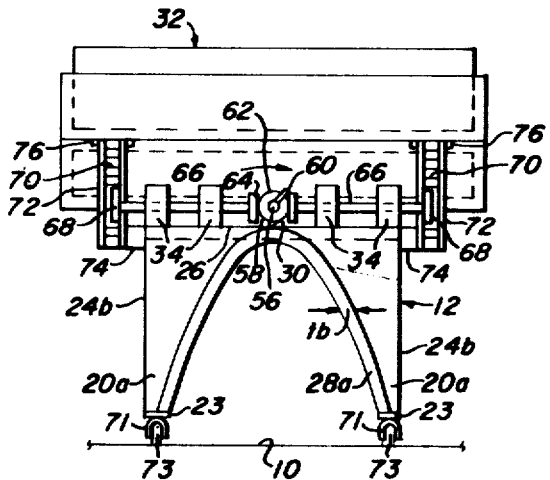
FIG. 4
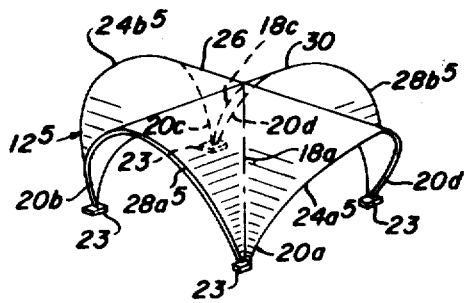
FIG. 5
INVENTOR
WILLIAM J. RIFFE
By 
Attorney

INVENTOR
WILLIAM J. RIFFE

Sept. 20, 1971   W. J. RIFFE   3,606,452
VEHICLE SEAT

Filed Feb. 2, 1970   3 Sheets-Sheet 3

INVENTOR
WILLIAM J. RIFFE

Attorney

United States Patent Office 3,606,452
Patented Sept. 20, 1971

3,606,452
VEHICLE SEAT
William J. Riffe, Scott Township, Allegheny County, Pa.,
assignor to United States Steel Corporation
Filed Feb. 2, 1970, Ser. No. 7,652
Int. Cl. B60r 21/10
U.S. Cl. 297—216
28 Claims

ABSTRACT OF THE DISCLOSURE

An armored seat for an armored vehicle such as a tank, jeep, airplane, helicopter or the like is disclosed. The armored vehicle has a floor and the seat has a base provided with a side-to-side barrel vault intersecting a front-to-back barrel vault to provide a plurality of resilient base legs mounted on the floor and for crash attenuation. A seat portion is secured to the base. The base provides a curved surface wherein the angle of obliquity with a normal to the surface point at which a projectile strikes the surface is greater than zero, thereby deflecting from the seat portion the projectile and the resulting spall from the surface point.

BACKGROUND OF THE INVENTION

Heretofore, seats for armored aircraft, helicopters, tanks and the like have been protected by ceramic armor of the boron carbide or alumina silicate type. Such ceramic armor is composed of many small parts and results in a complicated armored seat or chair having a substantial weight, such weight being a particular problem in aircraft and helicopter applications. When hit by a projectile, such ceramic armor is not repairable and must be replaced.

OBJECTS OF THE INVENTION

It is the general object of this invention to avoid and overcome the foregoing and other difficulties of and objections to prior art practices by the provision of a self-supporting vehicle seat for an armored vehicle such as an airplane, helicopter, tank, jeep, or the like which armored vehicle seat:

(1) deflects any projectile hitting the seat and the resulting spall from the surface point at which the projectile strikes the seat away from the seat portion thereby preventing injury to the occupant of such seat;

(2) is simple and rugged in structure and self supporting;

(3) comprises few component parts and is readily assembled and disassembled;

(4) is adapted to fit a wide variety of widths of seat tracks utilized for mounting the seat, regardless of the width of the seat portion of the seat;

(5) provides a wide range of crash attenuation in the leg portions of the seat by the proper combination of material thickness in the base and of the diameter of the fillets between the intersections of the side-to-side barrel vault and the front-to-back barrel vault;

(6) provides easy attachement of the seat to the floor of the vehicle or to a mounting track on such floor; and (7) is readily repaired, as by welding or the like, in the event of projectile damage.

BRIEF SUMMARY OF THE INVENTION

The aforesaid objects of the invention and other objects which will become apparent as the description proceeds are achieved by providing an armored seat for an armored vehicle such as a tank, jeep, airplane, helicopter, or the like. The armored vehicle has a floor and the seat has a base provided with a side-to-side barrel vault intersecting a front-to-back barrel vault to provide a plurality of resilient base legs mounted on the floor and for crash attenuation. A seat portion is secured to the base. The base provides a curved surface wherein the angle of obliquity with a normal to the surface point at which a projectile strikes the surface is greater than zero, thereby deflecting the projectile and the resulting spall from the surface point from the seat portion.

BRIEF DESCRIPTION OF THE SEVERAL VIEWS OF THE DRAWINGS

For a better understanding of this invention, reference should be had to the accompanying drawings wherein like numerals of reference indicate similar parts throughout the several views and wherein:

FIG. 1 is a perspective view of a base of the deep groined vault type showing an intersecting side-to-side barrel vault and a front-to-back barrel vault to provide a plurality of resilient base legs and front edges which are substantially perpendicular to the apexes;

FIG. 2 is a front elevational view of the base shown in FIG. 1 taken along the line 2—2 of FIG. 1 in the direction of the arrows; and showing the front-to-back barrel vault, a seat pan and a cushion member;

FIG. 3 is a side elevational view taken along the line 3—3 of FIG. 2 in the direction of the arrows and showing the side-to-side barrel vault, the front fixed mounting of the seat portion and the pivotable back mounting of the seat portion on the base;

FIG. 4 is a view similar to FIG. 2 alternatively showing an elevating mechanism mounted on the front of the base and a track arrangement and eliminating for clarity the pivotable mounting on the rear of the seat portion;

FIG. 5 is a perspective view of an alternative form of the base and showing tapered edge portions of the vaults;

Figure 5A:
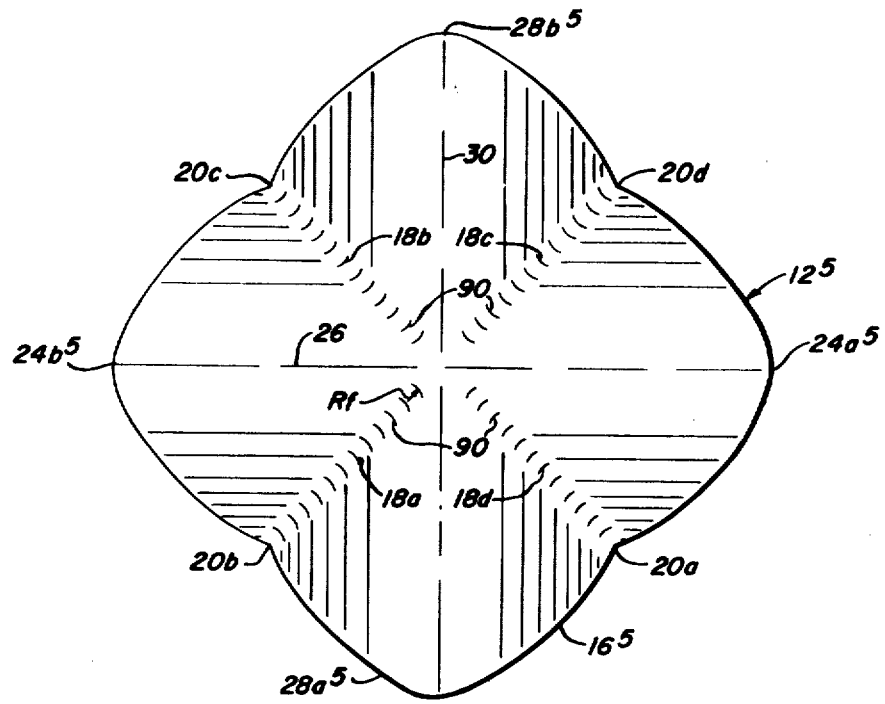
FIG. 5A is an enlarged plan view of the base shown in FIG. 5 and showing the diameter of the fillets along the intersections of the side-to-side vault and the front-to-back vault.

Although the principles of the invention are broadly applicable to armored seats for armored vehicles, this invention is particularly adapted for use in conjunction with an aircraft seat and hence it has been so illustrated and will be so described.

DETAILED DESCRIPTION

With specific reference to the form of this invention illustrated in the drawings and referring particularly to FIGS. 1-3, a floor of an armored vehicle is indicated generally by the reference numeral 10. An improved armored seat for such armored vehicle has a base 12, FIGS. 1–3, having a side-to-side barrel vault 14 (FIGS. 1–3) intersecting a front-to-back barrel vault 16 (FIGS. 1–3) along the intersection lines 18*a* (FIGS. 1, 5A), 18*b* (FIG. 5A), 18*c* (FIGS. 1, 5A), and 18*d* (FIG. 5A) to provide a plurality of resilient base legs 20*a* (FIGS. 1, 2, 3), 20*b* (FIGS. 1, 2), 20*c* (FIG. 1), 20*d* (FIGS. 1, 3) mounted on the floor 10 by means of screws 22 (FIGS. 2, 3) extending through foot pads 23 (FIGS. 1–3 into the floor 10 and utilized for crash attenuation.

The side-to-side barrel vault 14 has side edges 24*a* (FIGS. 1–3), 24*b* (FIGS. 1, 2) and an apex 26 (FIGS. 1–3). The front to back barrel vault 16 has front edge 28*a* (FIGS. 1–3), back edge 28*b* (FIGS. 1, 2) and an apex 30 (FIGS. 1–3) intersecting the apex 26 on the axis A—A (FIG. 1) of the base 12. The apex 26, 30 intersect at angle $b$ (FIG. 1) which angle $b$ may be greater than 0° and are shown in FIG. 1 substantially perpendicular to each other. The edges 24*a*, 24*b*, 28*a*, 28*b* (FIG. 1) are substantially perpendicular to their respective apexes 26, 30. For the purpose of mounting a seat portion 32 on the base 12, the base 12 is provided with side mounting blocks 34 (FIGS. 1–3) mounted along opposite ends of the apex 26 and a pivot block 36 (FIGS. 1, 2) mounted astride the apex 30 adjacent the back edge 28*b*. The side mounting blocks 34 and the pivot block 36 are secured to the base 12, as by screws 38 (FIG. 1) or the like.

In order to secure the front portions of a seat portion 32 (FIGS. 2, 3) of the armored seat, the front portion (FIG. 3) of a seat pan 40 (FIGS. 2, 3) is mounted by means of two screws 42 or the like, each screw 42 extending through the front portion of the seat pan 40, a front mounting bracket 44 (FIGS. 2, 3) and into the side mounting block 34. The rear portions (FIG. 3) of the seat pan 40 may be similarly rigidly fixed. As shown particularly in FIG. 3, however, the rear portions of the seat pan 40 are secured as by screws 42 (FIG. 3) to a rear mounting bracket 46 (FIG. 3), which rear mounting bracket 46 carries a pair of opposed pivot blocks 48 (FIGS. 2, 3) secured thereto as by welding or the like. In order to permit pivotable movement of the rear portions of seat pan 40, a rod 50 (FIG. 2) extends through the pivot blocks 48 and the pivot block 36 and has its ends secured in place, as by cotter pins 52 or the like (FIG. 2).

A suitable cushion 54 (FIGS. 2, 3) formed of a resilient material, such as polyurethane or the like, is disposed in the seat pan 40.

The base 12 and the seat pan 40 may be formed of dual-hardness composite steel armor having the following (for example) approximate composition, heat treatment, and mechanical properties:

CHEMICAL COMPOSITION

| | Percent by weight | | | | | | | | |
|---|---|---|---|---|---|---|---|---|---|
| | C | Mn | P | S | Si | Ni | Cr | Mo | Fe |
| Front | 0.55 | 0.75 | 0.008 | 0.008 | 0.25 | 1.20 | 0.75 | 0.50 | Balance. |
| Rear | 0.30 | 0.75 | 0.008 | 0.008 | 0.25 | 1.20 | 0.75 | 0.50 | Do. |

HEAT TREATMENT

Hardening (quenching and tempering)

Optimum hardness for resistance to penetration by armor-piercing projectiles is obtained by austenitizing at about 1500° F., cooling at an H value of about 0.3 (either an oil quench or modified water quench) to avoid quench cracking, and tempering at about 250 to 300° F.

Softening (normalizing and tempering)

Material may be softened for forming purposes by austenitizing at about 1480° F., air cooling, tempering at about 1290° F. for about 2 hours, and air cooling.

Mechanical Properties

| Yield strength (0.2% offset), K s.i. | Tensile strength, K s.i. | Elongation, percent | Reduction of area, percent | Charpy V-notch energy absorption, ft.-lb. |
|---|---|---|---|---|
| Quenched and tempered 0.5-inch-thick plate | | | | |
| 210 | 285 | 3.5 | 11.0 | 6 |
| Normalized and tempered 0.32-inch-thick plate | | | | |
| 92 | 110 | 14.0 | 33.1 | |

OPERATION

From a consideration of FIG. 1, it is apparent that the base 12 is provided with a curved surface wherein the angle of obliquity $x$ (FIG. 1) with a normal N—N (FIG. 1) to the surface point P (FIG. 1) at which a projectile (not shown) or the like indicated by the arrow in FIG. 1 strikes such surface is greater than 0° thereby deflecting from the seat portion 32 the projectile, not shown, and any resulting spall from such surface point P.

ALTERNATIVE EMBODIMENTS

It is to be understood by those skilled in the art that alternatively as shown in FIG. 4 an elevating mechanism may be mounted on the side mounting blocks 34. In the embodiment shown in FIG. 4, a shaft 56 journaled in a bearing 58 mounted on the apex 30 adjacent the front edge 28*a*. The shaft 56 is provided with a handle 60 (FIG. 4) and carries a gear 62 meshing with pinion gears 64 on shafts 66. Such shafts 66 (FIG. 4) are journaled in the side mounting blocks 34 and carry outer gears 68. Each of the gears 68 engages a rack 70 (FIG. 4) slidable in a housing slide 72 mounted by means of brackets 74 on the side edges 24*a*, 24*b*. The upper end of the rack 70 is pivotably connected to the front portion of the seat pan 40 at 76. The foot pans 23 are secured, as by welding or the like, to guides 71, which guides 71 ride on tracks 73 secured to the floor 10 as by screws or the like (not shown).

In operation, rotation of the handle 60, shaft 56 and gear 62 in the direction of the arrow (clockwise as shown in FIG. 4) causes the shafts 66 and the gears 64 and 68 to move in the opposite direction thereby raising the racks 70 and causing elevation of the front portion of the seat portion 32 on the rear pivot rod 50 (not shown in FIG. 4).

Figure 6:
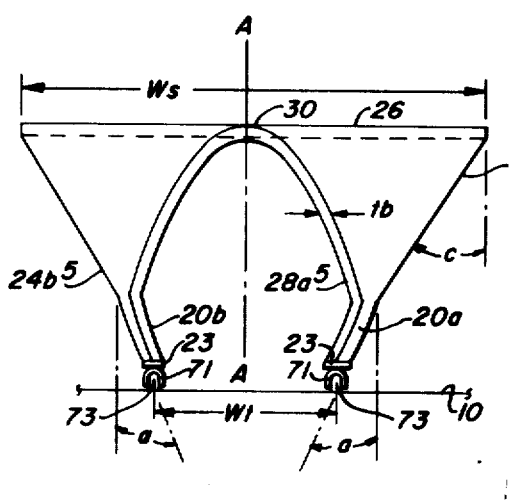
FIG. 6 is a front elevational view of an alternative form of the base shown in FIG. 5 and showing tapered resilient leg portions.

In FIGS. 5, 5A, 6, the side edges 24*a*, 24*b* and the front and back edges 28*a*, 28*b* taper at an angle C (FIG. 6) from the apexes 26 and 30 respectively to the legs 20*a*, 20*b*, 20*c*, 20*d*. As, for example as shown in FIG. 6, the width W$s$ of the seat portion 32 (not shown in FIG. 6) is considerably larger than the track width W$t$, the legs 20*a*, 20*b*, 20*c*, 20*d* may be also tapered inwardly toward the axis A—A at an angle $a$ (FIG. 6) and the bottoms or pads 23 of such legs 20*a*, 20*b*, 20*c*, 20*d* may be mounted as by welding or the like on guides 71 engageable with tracks 73.

Figure 7:
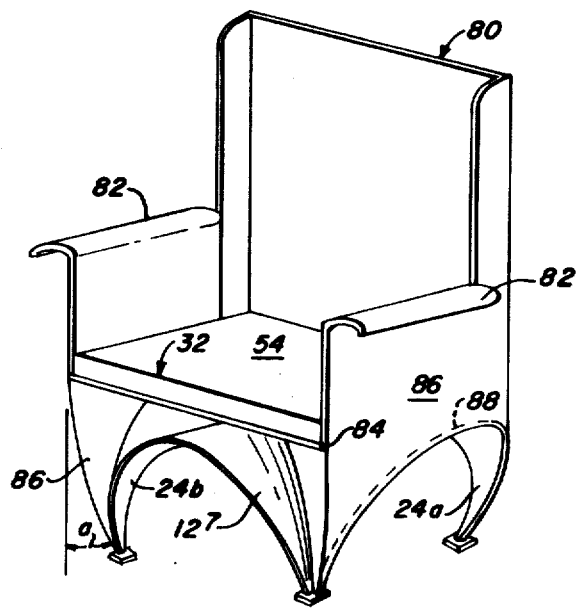
FIG. 7 is a perspective view of an armored seat having the tapered resilient leg portions of FIG. 6 and showing a side and back portion welded to the base along the side arches and a seat cavity for reception of a seat therein.

In FIG. 7, a side and back portion 80 formed of the same type of dual hardness laminated armor as the base 12[7] is provided with arm rest portions 82, a cushion supporting portion or seat pan 84, and side edge portions 86, which side edge portions 86 are adapted to fit closely to the tapered side edges 24*a*, 24*b* and to be welded thereto as by welds indicated at 88 in FIG. 7.

Figure 8:
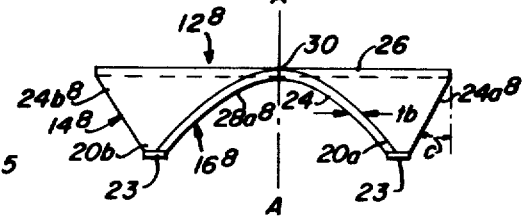
FIG. 8 is a front elevational view similar to FIG. 6 of an alternative embodiment of the base showing a hyperbolic barrel vault and a straight line taper on the vault edges.

FIG. 8 shows an alternative embodiment of the base 12[8] having intersecting hyperbolic barrel vaults 14[8], 16[8] and provided with planar (straight) tapered sides edges 24*a*[8], 24*b*[8] and planar (straight) tapered front edges 28*a*[8]. The tapered back edge is not shown in FIG. 8. Such edges 24*a*[8], 24*b*[8], 28*a*[8], etc. are tapered at an angle C (FIG. 8) with respect to a line parallel to the axis A—A.

Figure 9:
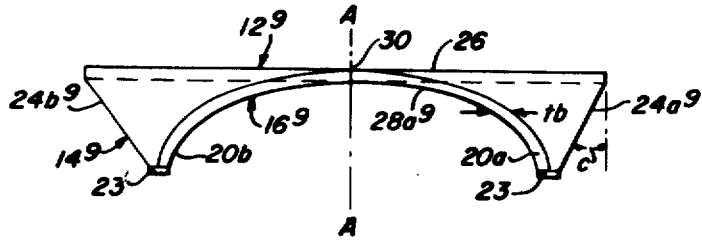
FIG. 9 is a view similar to FIG. 8 of another alternative embodiment of the base and showing an elliptic barrel vault.
Figure 9:
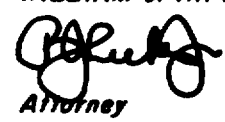

In FIG. 9, elliptic barrel vaults $14^9$, $16^9$ are shown as well as planar (straight) tapered side edges $24a^9$, $24b^9$ and front edge $28a^9$, all tapered at an angle C (FIG. 9).

Figure 10:
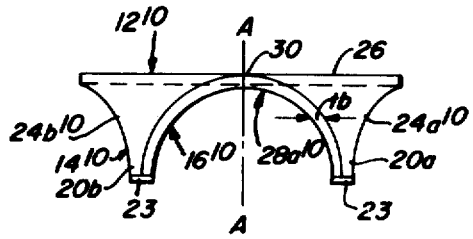
FIG. 10 is a view similar to FIGS. 7 and 8 of an alternative embodiment of the base showing a circular barrel vault and an arcuate taper on the vault edges.

FIG. 10 shows the barrel vault edges $24a^{10}$, $24b^{10}$, $28a^{10}$, each provided with an arcuate taper from the apex 26 and 30 respectively of each vault $14^{10}$, $16^{10}$ to the adjacent legs 20a, 20b, etc.

Figure 11:
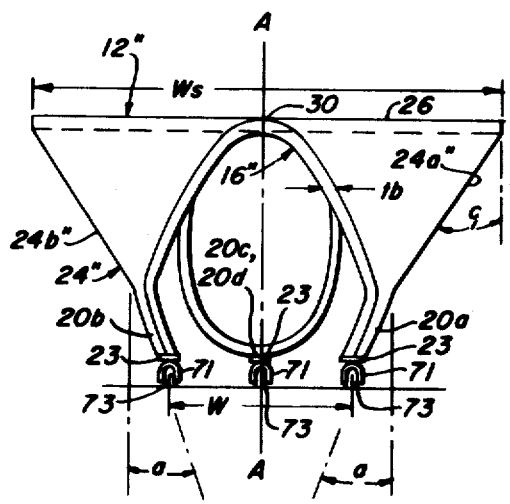
FIG. 11 is a view similar to FIG. 6 of a further alternative embodiment wherein the rear legs curve together and are mounted on a third track.

FIG. 11 shows the rear legs 20c, 20d formed together and having their pad 23 secured to a guide 71 on a third track 73, thus providing a three-track system.

Figure 12:
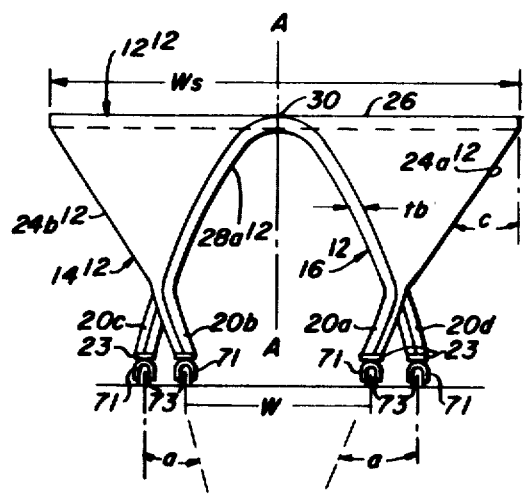
FIG. 12 is a view similar to FIG. 11 of another embodiment utilizing four legs and four tracks.

FIG. 12 shows tapered in front legs 20a, 20b having their pads 23 engageable through guides 71 with tracks 73 and the rear legs 20c, 20d similarly engaged with tracks 73 to provide a four-track system. The front legs 20a, 20b taper inwardly toward centerline A—A. The legs 20c, 20d taper outwardly from centerline A—A.

For the purpose of providing a wide range of crash attenuation limits in the legs 20a, 20b, 20c, 20d, the proper combination of material thickness $t_b$ (FIGS. 2, 3, 4, 6, 8–12) in the base 12, $12^4$, $12^5$, $12^8$–$12^{12}$ and the diameter or radius $R_F$ (FIG. 5A) of the fillets 90 (FIG. 5A) along the intersections 18a, 18b, 18c, 18d (FIG. 5A) between the side-to-side barrel vault $14^5$ and the front-to-back barrel vault $16^5$ (FIG. 5A) is required. An increase in the base thickness $t_b$ decreases the resiliency of the legs 20a, 20b, 20c, 20d. An increase in the fillet radius $R_F$ increases the resiliency of the legs 20a, 20b, 20c, 20d. The resiliency of the legs 20a, 20b, 20c, 20d is inversely proportional to the thickness $t_b$ and directly proportional to the fillet radius $R_F$.

SUMMARY OF THE ACHIEVEMENTS OF THE OBJECTS OF THE INVENTION

It will be recognized by those skilled in the art that the objects of this invention have been achieved by providing an improved armored seat for an armored vehicle such as an airplane, helicopter, tank, jeep, or the like. This armored seat deflects any projectile hitting the base 12 (FIGS. 1–3), $12^4$ (FIG. 4), $12^5$ (FIGS. 5, 5A, 6), $12^7$ (FIG. 7), $12^8$–$12^{12}$ (FIGS. 8–12) and deflects any resulting spall from the surface point P (FIG. 1) at which the projectile strikes the seat, thereby preventing contact with the projectile and the seat portion 32 (FIGS. 2, 3, 7) and preventing injury to the occupant of the seat. The armored seat is simple and rugged in structure and is self supporting. The armored seat comprises few component parts, such as a base 12 (FIG. 1) etc., a seat portion 32, (FIGS. 2, 3) and in some cases, a side and back portion 80 (FIG. 7) and is readily assembled and disassembled. The armored seat is adapted to fit a wide variety of seat tracks 73 (FIGS. 4, 6, 11, 12) utilized for mounting the seat regardless of the width Ws, FIG. 6, of the seat portion 32 and the width Wt of the tracks 73 (FIGS. 4, 6, 11, 12). The armored seat provides a wide range of crash attenuation limits in the leg portions 20a, 20b, 20c, 20d of the seat between proper combinations of material thickness $t_b$ of the base 12 (FIG. 1) etc. and of the radius $R_F$ (FIG. 5A) between the intersections 18a, 18b, 18c, 18d of the side-to-side barrel vault 14 (FIGS. 1–3) $14^4$ (FIG. 4), $14^5$ (FIGS. 5, 5A, 6) and $14^8$–$14^{12}$ (FIGS. 8–12) and the front-to-back barrel vault 16 (FIGS. 1–3), $16^4$ (FIG. 4), $16^5$ (FIGS. 5, 5A, 6), and $16^8$–$16^{12}$ (FIGS. 8–12). The armored seat is easily attached to the floor 10 of the vehicle or to mounting tracks 73 on such floor 10 and can be readily repaired in the event of damage from a projectile or the like.

While in accordance with the patent statutes, preferred and alternative embodiments of the invention have been illustrated and described in detail, it is to be particularly understood that the invention is not limited thereto or thereby.

I claim:

1. An armored seat for an armored vehicle having a floor, said seat having:

(a) a base having a side-to-side barrel vault intersecting a front-to-back barrel vault in intersections to provide a plurality of resilient base legs mounted on said floor and for crash attenuation; and (b) a seat portion secured to said base, (1) said base providing a curved surface wherein the angle of obliquity with a normal to the surface point at which a projectile strikes said surface is greater than 0° thereby deflecting from said seat portion said projectile and the resulting spall from said surface point.

2. The armored seat recited in claim 1 wherein one vault of said side-to-side barrel vault and said front-to-back barrel vault has an apex and an edge and said edge is substantially perpendicular to said apex.

3. The armored seat recited in claim 1 wherein one vault of said side-to-side barrel vault and said front-to-back barrel vault has an apex and an edge and said edge has a tapered portion from said apex to the adjacent legs.

4. The armored seat recited in claim 3 wherein said tapered portion is planar.

5. The armored seat recited in claim 3 wherein said tapered portion is arcuate.

6. The armored seat recited in claim 1 wherein said side-to-side barrel vault has a side-to-side apex and said front-to-back barrel vault has a front-to-back apex, said apexes intersecting substantially perpendicular to each other.

7. The armored seat recited in claim 1 wherein said side-to-side barrel vault has a side-to-side apex and said front-to-back barrel vault has a front-to-back apex, said apexes intersecting at any angle substantially greater than zero.

8. The armored seat recited in claim 1 wherein one vault of said side-to-side barrel vault and said front-to-back barrel vault is a parabolic barrel vault.

9. The armored seat recited in claim 1 wherein one vault of said side-to-side barrel vault and said front-to-back barrel vault is a hyperbolic barrel vault.

10. The armored seat recited in claim 1 wherein one vault of said side-to-side barrel vault and said front-to-back barrel vault is an illiptic barrel vault.

11. The armored seat recited in claim 1 wherein one vault of said side-to-side barrel vault and said front-to-back barrel vault is a circular barrel vault.

12. The armored seat recited in claim 1 wherein one vault of said side-to-side barrel vault and said front-to-back barrel vault is an arcuate barrel vault.

13. The armored seat recited in claim 1 wherein one resilient leg has a resiliency inversely proportional to the thickness of said base.

14. The armored seat recited in claim 1 wherein one resilient leg has a resiliency proportional to the radius of said intersections.

15. The armored seat recited in claim 1 wherein said plurality of legs is four.

16. The armored seat recited in claim 1 wherein said plurality of legs is three.

17. The armored seat recited in claim 1 wherein one of said resilient legs have a tapered leg portion which is tapered.

18. The armored seat recited in claim 17 wherein tapered leg portion tapers inwardly.

19. The armored seat recited in claim 17 wherein said tapered leg portion tapers outwardly.

20. The armored seat recited in claim 1 wherein one of said legs carries a guide.

21. The armored seat recited in claim 20 and having a track on said floor, said guide riding on said track.

22. The armored seat recited in claim 1 and having said seat portion pivoted on one end on said base, and an elevating mechanism connected between said base and said other end of said seat portion.

23. The armored seat recited in claim 1 wherein said seat portion has a side and back portion.

24. The armored seat recited in claim 23 wherein said side and back portion has side portions which are secured to said side-to-side vault.

25. The armored seat recited in claim 1 wherein said seat portion has a seat pan and a cushion in said seat pan, said seat pan being formed of dual hardness armor.

26. The armored seat recited in claim 1 wherein said base is formed of dual hardness armor.

27. The armored seat recited in claim 26 wherein said dual hardness armor is a laminate composed of a hard side and a relatively softer side.

28. The armored seat recited in claim 27 wherein said hard side faces away from said seat portion.

References Cited

UNITED STATES PATENTS

| 1,564,354 | 12/1925 | Junkers | 244—121 |
| 2,993,733 | 7/1961 | Pinkham | 297—445 |
| 3,314,721 | 4/1967 | Smith | 297—445 |
| 3,395,067 | 7/1968 | Lane | 89—36A |
| 3,420,475 | 1/1969 | Castillo | 297—216X |

FRANCIS K. ZUGEL, Primary Examiner

U.S. Cl. X.R.

89—36R; 297—217, 445